Patented Apr. 25, 1944

2,347,633

UNITED STATES PATENT OFFICE 2,347,633

ORGANIC PHOSPHORUS COMPOUNDS

Gennady M. Kosolapoff, Dayton, Ohio, assignor to Monsanto Chemical Company, a corporation of Delaware No Drawing. Application May 7, 1941,
Serial No. 392,398

11 Claims. (Cl. 260—501)

The present invention relates to new organic phosphorus containing compounds which have been found to have surface active properties.

The present compounds are new phosphinic acids of alkylated benzene hydrocarbons and amine derivatives or salts thereof. They may be generally represented by the formula:

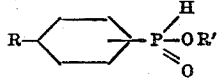

where R is an alkyl group of 5 or more carbon atoms in length and R' is hydrogen or a base, particularly a nitrogenous base.

The present group of alkylated aromatic phosphinate compounds are especially valuable as surface tension modifiers, particularly for the production of oil soluble emulsifying, wetting, dispersing and spreading agents for use in insecticides, emulsified paints, inks in dry cleaning compositions, etc.

As an example of the production of an alkyl aromatic phosphinic acid illustrating one form of my invention I react 265 g. of dodecyl benzene with 445 g. of PCl₃ in the presence of 49 g. of AlCl₃. This mixture may be refluxed for 5 days then extracted twice with 2 liters of hexane and the extracting solution then vacuum concentrated. The residue obtained upon concentration is poured upon ice and neutralized with NaOH in dilute solution. The solution is then filtered, acidified with HCl and can again be extracted with hexane followed by concentration. The product, dodecyl benzene phosphinic acid, is obtained after evaporation of the hexane as a yellow oily acid, the yield is approximately 54% of theory.

In place of the dodecyl benzene described above I may carry out the same reaction using any of the alkylated benzene hydrocarbons, such as amyl benzene, hexyl benzene, heptyl benzene, octyl benzene, nonyl benzene, decyl benzene, etc. The corresponding phosphinic acids in which the phosphorus is joined to the aromatic residue is obtained in good yields. These products are generally viscous yellow oils.

The above mentioned alkyl benzene phosphinic acids have pronounced acid qualities and I have found that they may be combined directly with a nitrogenous organic base to produce stable salts. Suitable organic bases are the amines which may be either primary, secondary or tertiary, hydroxy amines, or aromatic amines such as aniline, etc.

The following are examples of amine derivatives of my new phosphinic acids:

Upon the addition of cyclohexylamine to dodecyl benzene phosphinic acid I obtain a yellow viscous liquid of pronounced water solubility having the chemical structure:

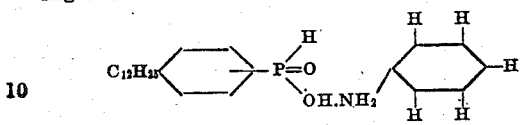

Water solutions of this derivative showed the following DuNouy surface tension, interfacial tension, and spreading coefficients:

| Concentration of solution per cent | 1 | 0.25 | 0.0625 |
|---|---|---|---|
| Surface tension, dynes per cm | 33.2 | 32.7 | 33.6 |
| Interfacial tension, dynes per cm | 1.5 | 1.4 | 2.0 |
| Spreading coefficient | −0.2 | +0.4 | −1.1 |

Upon the addition of triethanolamine to dodecyl benzene phosphinic acid I obtain a yellowish thin wax of slight solubility in water, and having the structure:

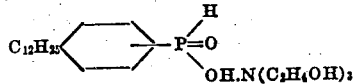

Upon the addition of dodecyl amine to dodecyl benzene phosphinic acid I obtain also a yellow viscous liquid having the structure:

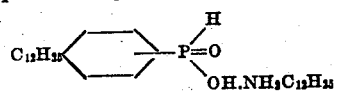

Upon the addition of diethyl amino-ethanol to dodecyl benzene phosphinic acid, I obtain a brown oil of good oil solubility and which is only slightly soluble in water. The structure is believed to be:

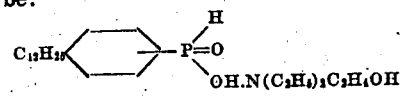

Upon the addition of normal butyl amine to dodecyl benzene phosphinic acid I obtain a water soluble product capable of forming a water solution of greatly reduced surface tension. The structure of this body is believed to be:

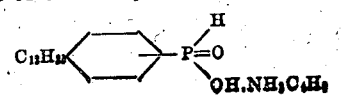

Water solutions of this derivative showed the following properties:

| Concentration of solution per cent | 1 | 0.25 | 0.0625 |
|---|---|---|---|
| Surface tension, dynes per cm | 31.6 | 31.6 | 32.8 |
| Interfacial tension, dynes per cm | 1.0 | 1.4 | 1.7 |
| Spreading coefficient | +1.9 | +1.5 | 0.0 |

My amine salts of alkyl phosphinic acids are in general soluble in oil and hence may be used as emulsifying, dispersing and wetting agents and may be incorporated into oils generally and especially into such oils as linseed oil or into dry cleaning solvents such as Stoddard solvent or in chlorinated hydrocarbon solvents.

For the production of products involving dispersions, my phosphinic acid derivatives are especially valuable. Being soluble in oils they may be employed for dispersing pigments and coloring matters in oils especially oils employed in making paints, varnishes, lacquers, enamels or printing or lithographic inks.

What I claim is:

1. Compounds having the structure:

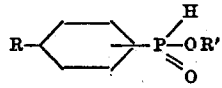

where R is an alkyl group of at least 5 carbon atoms in length, and R' is a nitrogenous base.

2. A dodecyl benzene phosphinic acid salt of a nitrogenous base.

3. A dodecyl benzene phosphinic acid salt of an amine.

4. The dodecyl benzene phosphinate salt of normal butyl amine.

5. The dodecyl benzene phosphinate salt of cyclohexylamine.

6. The dodecyl benzene phosphinate salt of dodecyl amine.

7. The alkyl benzene phosphinic acid salt of normal butyl amine, in which the alkyl group contains at least 5 carbon atoms.

8. The alkyl benzene phosphinic acid salt of cyclohexylamine, in which the alkyl group contains at least 5 carbon atoms.

9. The alkylbenzene phosphinic acid salts of an amine, in which the alkyl group contains at least 5 carbon atoms.

10. The alkylbenzene phosphinic acid salts of nitrogenous bases, in which the alkyl group contains at least 5 carbon atoms.

11. The alkylbenzene phosphinic acid salts of dodecyl amine, in which the alkyl group contains at least 5 carbon atoms.

GENNADY M. KOSOLAPOFF.